United States Patent [19]

Akazawa et al.

[11] Patent Number: 4,643,824

[45] Date of Patent: Feb. 17, 1987

[54] EDIBLE OIL CLEANER

[75] Inventors: Hozumi Akazawa; Kentaro Muto, both of Kobe, Japan

[73] Assignee: Chojoha Giken Kabushiki Kaisha, Hyogo, Japan

[21] Appl. No.: 644,959

[22] Filed: Aug. 28, 1984

[30] Foreign Application Priority Data

Sep. 14, 1983 [JP] Japan .................................. 58-168218

[51] Int. Cl.⁴ ............................................. B01D 33/00
[52] U.S. Cl. ............................ 210/167; 210/DIG. 8;
210/251; 210/256; 99/408
[58] Field of Search ......... 210/167, 251, 256, DIG. 8, 210/387, 134, 87, 90, 106; 99/408

[56] References Cited

U.S. PATENT DOCUMENTS

| 2,851,163 | 9/1958 | Anderson | 210/387 |
| 3,347,378 | 10/1967 | Arnold et al. | 210/106 |
| 3,483,981 | 12/1969 | Gordon | 210/167 |
| 3,581,896 | 6/1971 | Kuhlman | 210/387 |
| 3,690,466 | 9/1972 | Lee et al. | 210/387 |
| 3,701,313 | 10/1972 | Boggs | 210/DIG. 8 |
| 4,267,060 | 5/1981 | Miller | 210/791 |

FOREIGN PATENT DOCUMENTS 906227 8/1972 Canada .......................... 210/DIG. 8
6106 10/1926 Japan .
38-6106 5/1938 Japan .

Primary Examiner—Andrew H. Metz
Assistant Examiner—Sharon T. Cohen
Attorney, Agent, or Firm—Burns, Doane, Swecker & Mathis

[57] ABSTRACT

An edible oil cleaner wherein a perforated plate is provided to define a filtering zone within a filter housing, a portion of a filter web paid out of a roll thereof pivotably supported in the housing is disposed to lie over the perforated plate, the web is inserted at its downstream part between nip rollers to be movable when subjected to a rotational force of the nip rollers, and a motor for rotating the nip rollers is intermittently energized in response to a detection of deterioration in the filtering function of the filter web portion on the perforated plate, whereby impurities are continuously automatically filtered off from the edible oil introduced into the filter housing to effectively prevent the oil from being oxidized and to remarkably improve its durability.

6 Claims, 5 Drawing Figures

EDIBLE OIL CLEANER

TECHNICAL BACKGROUND OF THE INVENTION

This invention relates to edible oil cleaners which include means for filtering such impurities as fractions of fried foods and the like from the oil, used in a manner to effectively prevent the oxidation of oil.

The cleaners of the type referred to are provided with a filtering member and coupled to such a high temperature oil bath as a frier for cooking meat and the like food, so that the edible oil can circulate through the filtering member to have such impurities as the fried foods' fractions filtered off for preventing the oxidation of oil and the oil can be used relatively longer.

DISCLOSURE OF PRIOR ART

Conventionally, there has been widely used such a cleaning system as shown in FIG. 1, for the purpose of cleaning the edible oil used or, in other words, removing such impurities as fried foods' fractions so as to prevent the oil from being thereby easily oxidized. In the cleaning system of FIG. 1, the oil to be processed is supplied from a high temperature oil frier OF through a suction pump SP to a filtering tank FT. A filtering member, for example, a filter paper is disposed between oil inlet and outlet ports of the filtering tank FT so that, as the oil passes through the filtering member, the filtering member will filter the impurities from the oil. Such removal of the impurities prevents the oil from being oxidized to some extent. The filtered oil is returned by a discharge pump DP to the oil frier OF for re-use.

The high viscosity of the edible oil enables a relatively large amount of impurities to easily stay in the oil, and the filtering member in the system is caused to clog in a short time and required to be exchanged frequently. Yet, the oil temperature is very high and the entire filtering tank including the filtering member becomes also high in temperature, so that the frequent exchange of the filtering member manually performed must be conducted troublesomely after a sufficient cooling of the oil and tank, resulting in a poor operational filtering efficiency.

In order to increase the filtering capacity of the above system, on the other hand, the filtering tank FT could be enlarged to increase its capacity, or the filtering area could be increased by providing many pleats to the filter paper, whereupon the required costs for the filtering would become considerably high.

TECHNICAL FIELD OF THE INVENTION

A primary object of the present invention is, therefore, to provide an edible oil cleaner which can eliminate the foregoing defects, thus capable of performing a continuous filtering operation without requiring cumbersome manual exchange of the filtering member, increasing the filtering capacity without any need of a large filter housing, minimizing the cleaner in size, and lowering the required costs for the filtering remarkably.

According to the present invention, this object can be attained by providing, in the cleaner comprising a filter housing having oil inlet and outlet ports and a filtering zone defined between the inlet and outlet ports within the filter housing, a perforated plate member having many perforations allowing the oil to pass therethrough to be disposed in a part of the filtering zone, and a filter web to lie movably over the perforated plate member at a level lower than that of the oil within the filter housing.

Other objects and advantages of the present invention shall become clear from the following description of the invention detailed with reference to a preferred embodiment illustrated in accompanying drawings.

Figure 1:
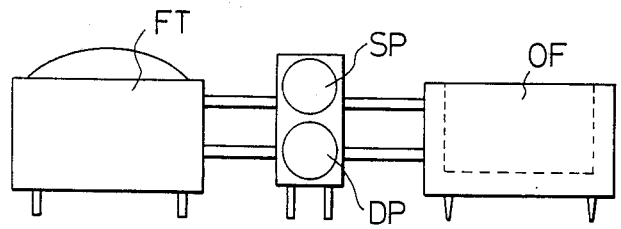
FIG. 1 is a schematic front view of a conventional edible oil cleaning system.
Figure 2:
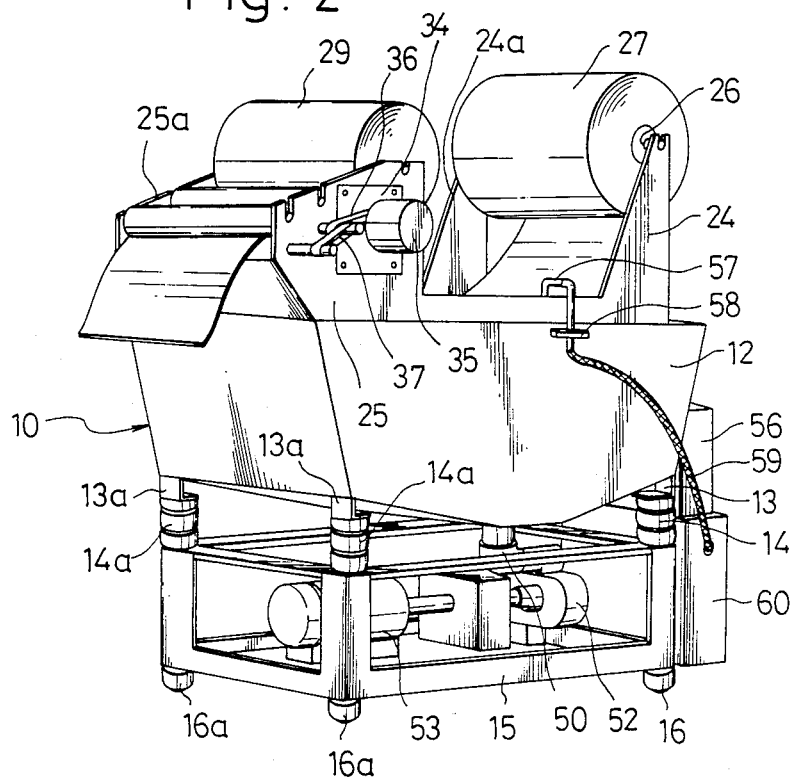
FIG. 2 is a perspective view of an embodiment of an edible oil cleaner according to the present invention.
Figure 3:
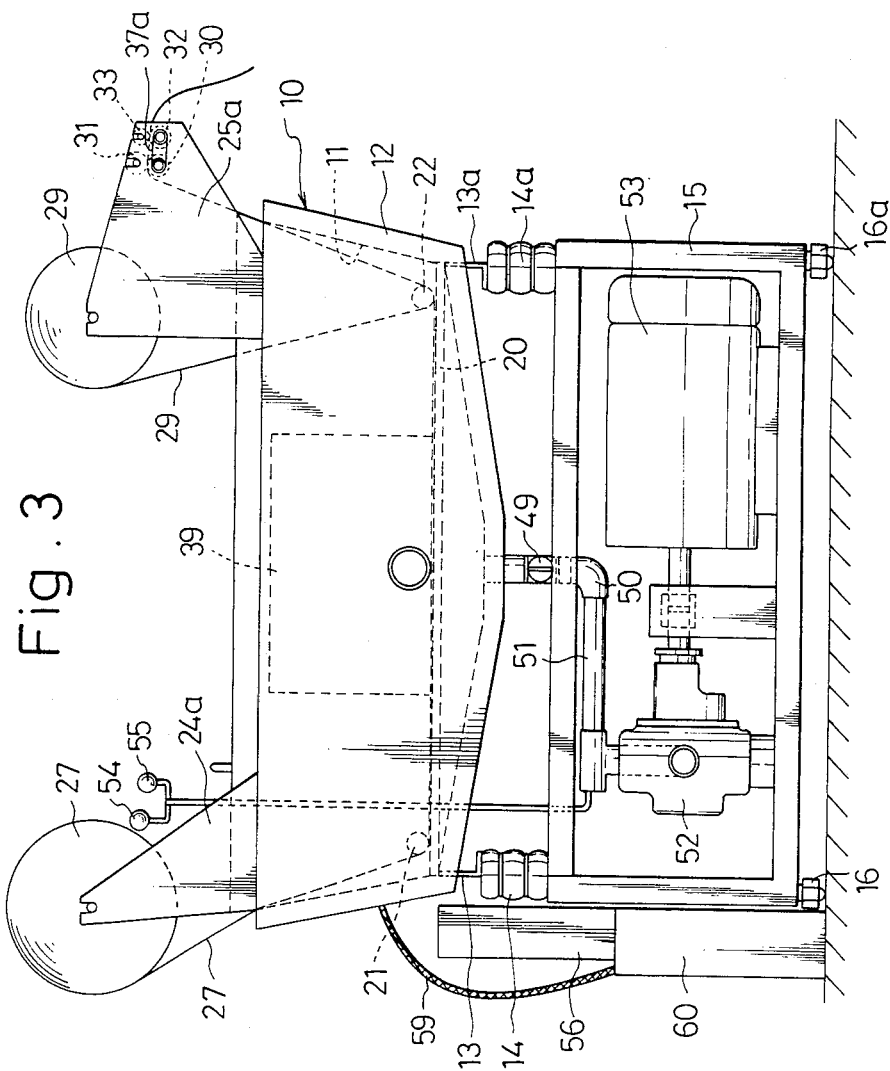
FIG. 3 is a side view of the cleaner of FIG. 2 as seen from the other side than that of FIG. 2.
Figure 4:
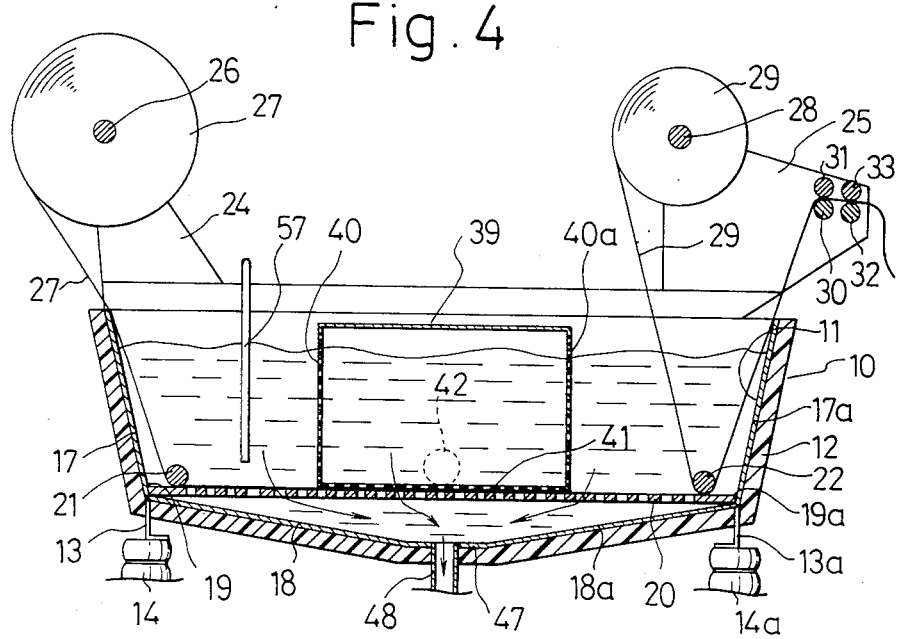
FIG. 4 is a fragmental vertically sectioned view at a filter housing of the cleaner of FIG. 2 with its lower parts omitted.

While the present invention shall now be described with reference to the preferred embodiment shown in the drawings, it should be understood that the intention is not to limit the invention only to the particular embodiment shown but rather to cover all alterations, modifications and equivalent arrangements possible within the scope of appended claims.

DISCLOSURE OF PREFERRED EMBODIMENT

Referring to FIGS. 2 to 5, there is shown an oil cleaner 10 according to the present invention, which can optimumly clean the used edible oil to effectively prevent it from being easily oxidized. The cleaner 10 includes a filter housing 11 made of a metal substantially in vessel shape, and the housing 11 is provided all over the outer peripheral surface with a layer of a heat resisting material 12 such as a rock wool. Welded to respective four corners of outer bottom surface of the filter housing 11 are two pairs of L-shaped fitting brackets 13 and 13a at their one vertical end extending through the heat resisting layer 12. The mounting brackets 13 and 13a are secured respectively at the other horizontal end to each of two pairs of intermediate legs 14 and 14a made of an electrically insulating material, preferably a porcelain insulator, which legs 14 and 14a in turn are fixedly mounted onto the four corners of upper surface of a rectangular base frame 15 which is formed preferably with a combination of beam members T-shaped and L-shaped in section. Mounted to the bottom side four corners of the base frame 15 are known height-adjustable legs 16 and 16a for rendering the height at the four corners of the base frame 15 to be adjustable and thus the horizontal attitude of the filter housing 11 to be retainable.

Both longitudinal end plates 17 and 17a of the filter housing 11 are slanted at an acute angle with respect to vertical line to open their upper ends, while the bottom wall of the housing is made deeper substantially in the central part with two bottom plates 18 and 18a slanted at an obtuse angle with respect to the vertical line and, horizontally across both longitudinal bottom edges 19 and 19a at each of which the plates 17, 18 and 17a, 18a are joined, there is disposed a plate member 20 perforated to have many perforations. The plate 20 divides the housing 11 into a filtering zone below the plate and oil receiving zone above the plate. Guide rollers 21 and 22 are provided on the upper surface of the perforated plate 20 respectively at a position close to each of the bottom edges 19 and 19a to lie in the width direction of the housing 11. It is preferable that the guide rollers 21 and 22 are rotatably held in the housing 11 as spaced from the surface of the perforated plate 20 by a small distance corresponding to the thickness of a filter web to be described later, by fitting axial pivot pins (not shown) of the guide rollers 21 and 22 into respective recesses formed in the opposing inner surfaces of side wall plates 23 and 23a of the filter housing 11.

On the other hand, two pairs of parallelly erected plates 24, 24a and 25, 25a are secured to the upper edges of the side plates 23 and 23a of the filter housing 11 respectively adjacent each longitudinal end thereof. A roller 26 is pivotably supported between the pair of the plates 24 and 24a on the side of the end plate 17 by fitting axial pivot pins of the roller 26 into respective notches provided at the tops of the plates 24 and 24a, and a filter web 27 made of an inexpensive non-woven filter paper and having a width slightly smaller than the inner width of the housing 11 is wound on the roller 26. Similarly, a roller 28 is pivotably supported between the other pair of the plates 25 and 25a on the side of the end plate 17a also by fitting axial pivot pins of the roller 28 into respective notches provided at the tops of the plates 25 and 25a, and a retentive paper web 29 having a width slightly smaller than the inner width of the housing 11 is found on the roller 28. In this case, the retentive paper web 29 is not required to have filtering ability and normally the web 29 may be thinner than the filter web 27. Two pairs of nip rollers 30, 31 and 32, 33 are pivotably supported in the vicinity of longitudinal outer ends of the supporting plates 25 and 25a by fitting axial pivot pins of the respective nip rollers into bearing holes in the plates 25 and 25a. The nip roller 30 in the inner positioned pair is coupled through a belt or chain 36 of an electrically insulating material to an output shaft of a driving motor 35 mounted through amounting plate 34 to the outer surface of the supporting plate 25, and is further coupled to the nip roller 32 of the outer positioned pair respectively at the both axial pins through belts or chains 37 and 37a disposed outside the supporting plates 25 and 25a, and the remaining rollers 31 and 33 of the both pairs are respectively brought into rolling contact with the rollers 30 and 32. When the motor 35 is energized, therefore, the rollers 30 and 32 are driven to rotate clockwise and the rollers 31 and 33 are caused to rotate counterclockwise in FIG. 3 or FIG. 4.

With this arrangement, the filter web 27 is initially manually paid out of the filter roller 26 and is guided through the guide rollers 21 and 22, lying over the perforated plate 20 with the own weight of the filter web, to the nip rollers 30, 31 and 32, 33 to be held between them. On the other hand, the retentive paper web 29 is also led from the roller 28 through the guide roller 22 to the nip rollers together with the filter web 27 disposed below the web 29. As the motor 35 is then energized, the clockwise rotated nip rollers 30 and 32 and counterclockwise rotated nip rollers 31 and 33 cause the both webs 27 and 29 to be moved and discharged out of the nip rollers at the downstream ends of the webs. The guide rollers 21 and 22 are provided with a proper weight, and the both webs 27 and 29 are paid out of the rollers 26 and 28 and moved while being properly tightened between the respective rollers 26, 28 and nip rollers 30-33.

Figure 5:
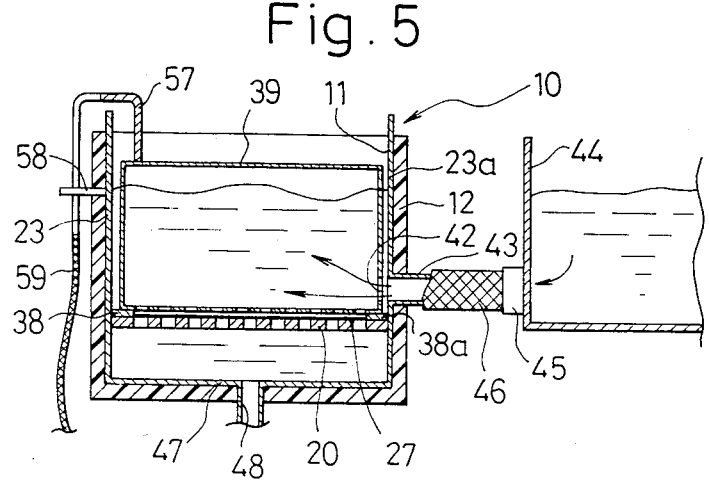
FIG. 5 is a fragmental cross-sectional view only at the filter housing of the cleaner of FIG. 2, additionally with an associated oil frier shown also fragmentarily in section as operably coupled to the filter housing.

As will be clear from FIG. 5, guide bars 38 and 38a are provided onto the perforated plate 20 to extend respectively longitudinally along each of the inner surfaces of the side plates 23 and 23a in the filter housing 11 with a spacing between the bars corresponding to the width of the web 27, so that the web 27 passing between the guide bars 38 and 38a can be properly guided. Further, a box-shaped strainer 39 for the impurities of relatively larger size is mounted on the top surfaces of the guide bars 38 and 38a, substantially in the middle of the perforated plate 20 in its longitudinal direction. The strainer 39 has a width slightly smaller than that of the housing 11. The strainer 39 is perforated at its longitudinal end plates 40 and 40a opposing the end plates 17 and 17a of the housing 11 and at the bottom plate 41 facing the filter web 27 for separating the relatively larger sized impurities from the oil made to flow smoothly into and out of the strainer, the flowing into the strainer 39 being made through an inlet 42 formed in one side wall of the strainer 39 so as to align with an inlet 43 formed in one side wall plate 23a of the housing when the strainer is placed in the housing 11, and the both inlets 42 and 43 being thus positioned at a level higher than the filter web 27 on the perforated plate 20 so that the level of oil introduced into the housing 11 will be always higher than that of the filter web 27.

The inlet 43 of the filter housing 11 communicates with an outlet 45 of such a high-temperature edible oil bath 44 as a frier through a connecting pipe 46 made of an electrically insulating material. In this case, the height of the housing 11 is adjusted by means of the height-adjustable legs 16 and 16a of the base frame 15 so that the inlet 43 will be substantially on the level of the outlet 45, and the position of the inlet 43 and thus the position of the filter web 27 will be lower than the oil level of the oil bath 44, for thereby ensuring the smooth flowing of oil from the oil bath 44 into the housing 11.

On the other hand, the bottom plate 47 of the filter housing 11 is provided with an outlet 48 which is connected through a valve 49 provided in a discharge pipe 50 and further through a connecting pipe 51 of an electrically insulating material to a suction pump 52 which is provided to be driven by a circulating motor 53 and also communicates with the oil bath 44 so that, when the motor 53 is operated, the oil filtered and sent to the pump 52 returns to the oil bath 44 for being re-used. Further, a vacuum pressure switch 54 is connected, for example, to an inlet side of the pump 52 and, if necessary, a visually pressure indicating gauge 55 is also provided together with the switch 54. This pressure switch 54 is electrically connected to a suitable control circuit (not shown) within a control box 56, the circuit functioning to intermittently energize the driving motor 35 in response to signals provided from the pressure switch 54 every time when the oil pressure imparted, for example, to the pump 52 rises to exceed a predetermined level. Therefore, it will be readily appreciated by those skilled in the art that, when the filter web 27 located on the perforated plate 20 clogs beyond a predetermined extent and the pressure to the pump 52 exceeds the predetermined level, the motor 35 is energized for a predetermined period to move the filter web 27 to have its new part located on the perforated plate 20. It will be also possible to employ any known timer means for the intermittent energization of the motor 35 for a predetermined period independently of the foregoing operation of the pressure switch 54 with the control circuit.

An electrode rod 57 for applying a harmonic potential to the oil within the filter housing 11 is provided to the housing so as to be sufficiently immersed into the oil in the housing 11, as suspended from the one side plate 23a of the housing 11 through a supporting member 58 and electrically connected through a connecting wire 59 to a harmonic potential generator 60 which may be of the type disclosed in Japanese Patent Publication No. 38-6106/1963. Briefly explaining the generator disclosed therein, the primary winding of a transformer is connected to a commercial power source and one end of the secondary winding thereof is sealingly insulated while the other end is connected, for example, to the electrode rod forming a harmonic potential applying means. This allows the harmonic potential to be applied to an object to be processed under the influence of the harmonic, and it is considered that the coupling force between respective molecules constituting the object is thereby caused to increases. Therefore, the oxidation of oil can be remarkably retarded when its molecular coupling is increased, because the oxidation of oil is considered to be the dissolution of oil molecules.

In applying the harmonic potential to the oil through the electrode rod 57 therein immersed, the filter housing 11 is not to be grounded so as not to form any electric path, since otherwise the harmonic potential cannot be applied to the oil inside the housing. In the present embodiment, therefore, the filter housing 11 is supported through the electrically insulating intermediate legs 13 and 13a, the connecting pipes 46 and 51 of electrically insulating material are interposed between the inlet 43 of the housing 11 and the outlet 45 of the oil bath 44 and between the discharge port 48 of the housing 11 and the inlet of the pump 52, and also the insulating belt 36 is used to interconnect the drive motor 35 and the nip rollers, so that the filter housing 11 can be reliably kept in an electrically isolated state with respect to the ground and a complete harmonic potential field can be provided to the oil in the housing 11 so as to further improve the effect of preventing the edible oil from being oxidized.

The operation of the oil cleaner according to the present invention shall now be summarized. The filter housing 11 is made to communicate through the connecting pipe 46 with the high temperature oil bath 44 so that the edible oil containing such impurities as the fried foods' fractions enters into the housing from the oil bath. In this case, if required, the legs 16 and 16a are properly adjusted to realize a desirable height position of the housing 11 with respect to the oil bath 44 for smoothly introducing the oil into the housing 11. Next, an input switch (not shown) provided in a control box 56 is turned on to energize the circulating motor 53 and suction pump 52. It is assumed at this point a new portion of the filter web 27 to which no impurity is deposited yet is positioned on the perforated plate 20.

As the pump 52 is driven, on the other hand, a negative pressure is caused to take place at a zone below the perforated plate 20 in the housing 11 through the pipes 50 and 51, that is, an attraction force generates at the particular zone so that substantially all of the oil sent from the oil bath 44 into the strainer 39 as well as a part of the oil caused to flow out of the strainer through its perforations to the interior of the housing 11 is forcibly caused to pass through the filter web 27 and perforated plate 20 into the zone below the plate 20. As a result, the relatively larger sized impurities in the oil are caught by the strainer 39 while relatively smaller sized impurities are caught by the filter web 27, so as to effectively clean the oil already used. The thus cleaned oil is returned by the pump 52 to the oil bath 44, and this oil circulation is cyclically repeated.

As the impurities are accumulated on the filter web 27 during the oil circulation and the oil conducting capability of the web drops, the oil pressure at the inlet of the pump 52 rises. When the pump inlet pressure reaches a predetermined value of, for example, 300 mm/Hg, the pressure switch 54 is actuated to energize the drive motor 35 through the control circuit within the control box 56 to drive the nip rollers 30-33 for a proper period determined by the timer in the control circuit for removing the portion of the filter web 27 with the accumulated impurities from the perforated plate 20 toward the nip rollers and simultaneously positioning the new portion of the web 27 on the perforated plate 20. In so doing, the filtering web departs from a downstream end of the plate 20. Accompanying this removal of the used portion of the filter web carrying the impurities from the perforated plate 20, the retentive paper web 29 is delivered from the roll 28 through the guide roller 22 and positioned onto a top side of the filtering web adjacent the downstream end of the plate 20. Thereafter, the retentive web is moved together with the filter web 27 in contact with the top side of the latter. Since, at this time, the both webs 27 and 29 between the guide roller 22 and the nip rollers 30-33 are given a proper tension, the impurities accumulated on the filter web 27 can be stably held between the webs 27 and 29 so as to be effectively discharged out of the filter housing 11 as held between the webs.

With the foregoing operation cyclically repeated, the edible oil being used can be continuously and automatically filtered without requiring frequent manual exchange of the filtering member as in the past. In an event where the level of oil in the filter housing 11 becomes lower than the filter web 27 on the perforated plate 20 during the operation, then the valve 49 in the discharge pipe 50 is closed to stop the circulating operation of oil and when the oil level becomes again higher than the filter web 27, the valve 49 is opened to restart the circulation.

In addition, simultaneously with the above filtering operation, the harmonic potential is applied to the oil in the filtering housing 11 from the generator 60 through the electrode rod 57. Since the edible oil itself is dielectric, the inside of the housing 11 is caused to be optimumly kept in an electrically isolated state, and the harmonic potential application through the electrode rod 57 to the oil will render an effective harmonic potential field to be formed for increasing the coupling force between the oil molecules. This enables, in cooperation with the filtering action of the filter web 27, the promotion of the edible oil cleaning, the remarkable retardation of oil oxidation and the remarkable improvement in the durability of oil.

The present invention can be modified in various manners. For example, when it is impossible to install the filter housing and high temperature oil bath in a side-by-side relation, a pump having the same capacity as the pump 52 may be provided in a path between the inlet 43 of the filter housing and the outlet 45 of the oil bath 44 to be driven in synchronism with the pump 52, allowing the proper oil circulation as in the above embodiment to be achieved. The linkage between the drive motor 35 and nip rollers and between the two pairs of nip rollers may be effected with a gear means instead of the belt or chain. Yet, the arrangement may also be made to have the filter housing 11 provided with a rack made preferably of a heat-proof plastic material for receiving the discharged webs 27 and 29 at a position below the discharging end of the nip rollers. In order to restrain the belt or the like coupling between the output shaft of the motor 35 and the axial pin of the nip roller 30 and between the axial pins of the rollers 30 and 32 from slipping, the shaft and pins may simply be knurled.

What is claimed as our invention is:

1. In an apparatus comprising a cooking oil cleaner which cleans cooking oil received from a cooking bath, said cooking oil cleaner comprising:
   a filter housing communicating with said cooking bath;
   a perforated plate disposed with said filter housing below an upper edge thereof for defining therein: a filtering zone beneath said perforated plate, and an oil receiving zone above said plate,
   an elongated filtering web disposed over said perforated plate,
   means for advancing said elongated filtering web along said perforated plate within said filter housing to periodically replace clogged portions of said web with unclogged portions thereof,
   oil conducting means for continuously communicating oil in said bath with said oil receiving zone regardless of the height of oil in said bath and for continuously maintaining the level of the oil in said housing higher than the level of said filtering web, and wherein a perforated, box-shaped strainer is disposed above said oil conductive means
   oil circulating means for communicating said filtering zone with said bath and for continuously producing a negative pressure in said filtering zone for circulating oil from said filtering zone to said bath, said filtering zone and said oil receiving zone arranged such that substantially all of said negative pressure is communicated to said filtering zone for forcefully drawing the oil through said filtering web and into said filtering zone.

2. A cleaner according to claim 1, wherein said means for advancing said filtering web comprises a filter roller pivotably supported on said filter housing, said filtering web being wound on said filter roller, guide rollers for engaging and positioning said filtering web to lie over said perforated plate, and nip rollers disposed at a downstream end of the filtering web in its moving direction and driven by a motor for moving the web.

3. A cleaner according to claim 2, wherein said moving means further conprises means for detecting a reduction in the filtering ability of a portion of said filtering web lying over said perforated plate and energizing said nip-roller driving motor, said nip rollers comprising two pairs of nip rollers operably coupled to each other.

4. A cleaner according to claim 3, wherein said oil circulating means is disposed outside said filtering housing and comprises a suction pump, an oil conduit communicating said pump with an outlet port of said filtering zone, and a motor for driving said suction pump; said filtering ability detecting means comprising a pressure switch disposed in said oil conduit.

5. A cleaner according to claim 1, wherein said perforated plate includes a downstream end from which said filtering web departs as said filtering web is advanced, a retentive paper web, means for positioning said retentive web onto a top side of said filtering web adjacent said downstream end of said perforated plate so that impurities accumulated on the filtering web are retained between the filtering web and said retentive web.

6. A cleaner according to claim 1, further comprising means for generating a harmonic potential and applying said harmonic potential to said oil in said filter housing, said applying means being mounted to the housing for being immersed in the oil, and an electrically isolating means is applied to the housing for preventing the housing from being electrically grounded so as to maintain a harmonic potential field within the housing.

* * * * *